(12) United States Patent
Davydov

(10) Patent No.: US 6,690,514 B2
(45) Date of Patent: Feb. 10, 2004

(54) SINGLE CRYSTAL POLARIZING PRISM AND METHOD OF MANUFACTURING THEREOF

(75) Inventor: Boris Davydov, Moscow (RU)

(73) Assignee: Solid Optics, Inc., Palo Alto, CA (US)

( * ) Notice: Subject to any disclaimer, the term of this patent is extended or adjusted under 35 U.S.C. 154(b) by 53 days.

(21) Appl. No.: 09/844,906

(22) Filed: Apr. 27, 2001

(65) Prior Publication Data

US 2002/0181103 A1 Dec. 5, 2002

(51) Int. Cl.$^7$ ................................................. G02B 5/30
(52) U.S. Cl. ........................ 359/495; 359/496; 359/500; 359/900; 359/487
(58) Field of Search ................................ 359/485, 487, 359/488, 494, 495, 496, 500, 900

(56) References Cited

U.S. PATENT DOCUMENTS

| | | | |
|---|---|---|---|
| 3,442,571 A | * | 5/1969 | Itzkan |
| 3,449,039 A | * | 6/1969 | Hoffman, Jr. |
| 3,511,556 A | * | 5/1970 | Ammann |
| 3,720,457 A | * | 3/1973 | Swartz et al. |
| 3,902,782 A | * | 9/1975 | Forman et al. |
| 4,017,153 A | * | 4/1977 | Sardos |
| 4,504,123 A | * | 3/1985 | Smith |
| 4,514,047 A | * | 4/1985 | Haskal et al. |
| 4,571,030 A | * | 2/1986 | Fountain |
| 5,184,248 A | * | 2/1993 | de Vaan et al. |
| 5,822,118 A | * | 10/1998 | Bergmann |
| 6,018,418 A | | 1/2000 | Pan et al. |
| 6,040,942 A | * | 3/2000 | Bergmann |
| 6,456,434 B1 | * | 9/2002 | Davydov |

FOREIGN PATENT DOCUMENTS

| | | | |
|---|---|---|---|
| DE | 2137422 | * | 2/1973 |
| DE | 2217175 | * | 3/1973 |
| JP | 0025707 | * | 3/1981 |
| RU | 1432439 | * | 10/1988 |
| RU | 001755239 | * | 8/1992 |
| WO | WO 9015357 | * | 12/1990 |

OTHER PUBLICATIONS

Handbook of Optics, vol. II, Devices, Measurements, and Properties; McGraw–Hill, Inc., 1995, pp. 3.1–3.70, N.Y., S.F., Montreal, Tokyo, Tornoto.

B.R. Belostotsky, Yu. V. Lyubavsky, V.M. Ovchinnikov, Fundamentals of Laser Technique, Moscow, Suvetskve Radio, 1972, pp. 125–127.

* cited by examiner

Primary Examiner—Ricky D. Shafer
(74) Attorney, Agent, or Firm—Schwegman, Lundberg, Woessner & Kluth, P.A.

(57) ABSTRACT

An anisotropic single-crystal polarizing prism for separation of the non-polarized beam into two orthogonally-polarized beams with minimal optical losses. The prism has a tetrahedral shape and is formed by four base planes having a predetermined angular orientation with respect to each other so that one of the polarized beams exists the prism at a Brewster angle by being refracted on the third base plane, while the second beam is reflected from the third base plane with total internal reflection and exits the prism through the fourth base plane in the normal direction thereto. The prisms is manufactured by the method of the invention which involves specific procedures of orienting of crystal at preliminary calculated angles to the planes of prism faces, and cutting the aforementioned base planes with reference to the calculated angles. The prism of the invention is a single-crystal device which is free of cementing connections and microscopic air gaps inherent in conventional prisms combined from separate elements. The single-crystal prism of the invention possesses characteristics unattainable in know polarizing single-crystal prisms.

30 Claims, 6 Drawing Sheets

SINGLE CRYSTAL POLARIZING PRISM AND METHOD OF MANUFACTURING THEREOF

FIELD OF INVENTION

The present invention relates to the field of optics, in particular, to optical devices for spatially separating or combining orthogonally polarized optical beams, in particular, to optical devices used as optical beam polarizers or analyzers in the optics of ultraviolet, visible, and infrared radiation, including laser emission.

BACKGROUND OF THE INVENTION

According to commonly accepted rule, orientation of the light-wave electric field determines its polarization direction, and the plane of the electric vector and the light propagation direction are referred to as a polarization plane. If electric field oscillations occur only in that plane, and the plane itself has a constant spatial position, such light is referred to as having linear or planar polarization (or simply polarized). If the wave electric vector rotates around the light propagation direction (i.e., around the wave vector), such light can have either elliptical or circular polarization. For nonmonochromatic light, i.e., for one containing a number of frequency components, the temporal changes in the amplitude and spatial position of its resulting electric vector can be absolutely arbitrary, and such light is referred to as unpolarized.

Linearly polarized light beams have found general application in optics, laser engineering, technology, e.g., for precision processing of metals (cutting, drilling etc.), in photochemistry for resonance excitation of molecules and atoms, in biology for similar purposes, in communication engineering, etc. The preference is given to polarized light due to higher accuracy of interaction of such light with materials. Such high interaction accuracy results from the complexity and anisotropy in the inner structure of the aforementioned materials. For example, most of the devices widely used in optics and communication engineering for entering information into a light beam, such as electrooptical and acoustooptical modulators, operate with linearly polarized light because of the pronounced anisotropy of optical properties in the crystals these devices are based upon. Fiber optics communication engineering is a field where polarized light has a constantly increasing application. Anisotropic fibers for polarized light and low-noise polarization amplifiers have been developed. In principle, polarized radiation is used for effective transformation of laser frequencies in nonlinear crystals and for selection of optical radiation frequencies by anisotropic tunable acoustooptical and electrooptical filters. The use of polarized light is required for operation of binary polarization switchers/modulators, polarization multiplexers and, in general, in any optical devices for which anisotropic interaction of light with the materials is advantageous.

There are a number of devices that can be used for light polarization. These include dichroism dye based polarizers, purely crystalline polarizers, interference polarizers, polarizers based on isotropic materials that use the effects of light reflection and light refraction at the Brewster angle, etc. The Brewster angle in air is an angle $\phi$ under a condition tan $\phi=N$, where N is a refraction index of the optical medium. Only the light with the component of the electric vector of the light wave, which is perpendicular to the plane of incidence, is reflected, while the light with the component which lies in the plane of incidence is not reflected but refracted. The so-called Brewster law defines a ratio between a refraction index N of the optical medium and such an angle $\phi$ of incidence on this medium of a natural (non-polarized) light, at which the beam reflected from the dielectric surface is totally polarized.

However, special accent is made on prism-type polarizers that have a specific geometry and are made of optically anisotropic crystalline materials. The reason for making such accent are special properties of these polarizers. As a rule, they are crystalline polarizers that exhibit high extinction (ratio of the useful and unnecessary orthogonally polarized light components) of polarized beams, low optical losses, and high resistance to high-power optical radiation, especially laser radiation.

For better understanding the principles of the present invention, it would be advantageous to briefly describe the structure of conventional polarizing prisms. The basics of polarizing devices are described, for example, in *Handbook of Optics, Vol. II, Devices Measurements and Properties*, McGraw-Hill, Inc., 1995, pp. 3.1–3.70, New York, San Francisco, Montreal, Tokyo, Toronto.

Polarizing prisms are made only of birefringent crystals that have no cubic crystal symmetry. In such crystals light is split into two orthogonally polarized beams which, upon exit from the crystal, are in general case spatially separated both with respect to the exit points and the propagation angles. However, for many reasons (small separation angles or distances, unavoidable frequency dispersion of the prism, reflection optical losses and technologically uncomfortable beam exiting geometry) simple single crystal prisms are replaced for combinations thereof that are referred to as polarizing prisms. Polarizing prisms are usually made of a relatively cheap and abundant calcite ($CaCO_3$). Recently a wide range of artificially grown birefringent crystals have been developed for polarizing prism applications. Such crystals are, for example, $TiO_2$, $YVO_4$, $KNbO_3$, $KTiOPO_4$, $\alpha\text{-}BaB_2O_4$, $PbMoO_4$, $TeO_2$, Te, Se, etc. However, the general use of these materials is precluded by their high cost, complexity of manufacturing compound prisms therefrom or insufficiently pronounced optical anisotropy (birefringence).

Advanced polarizing prisms usually contain two or more trihedral prisms made of optically uniaxial crystals of tetragonal, hexagonal, or trigonal symmetry having similar or different optical axis orientations and bonded to each other with transparent substances (cements) or separated from each other with a thin air or vacuum gap. Cement-free gaps are often used in prisms for short-wave radiation or high-power laser beams.

Figure 1:
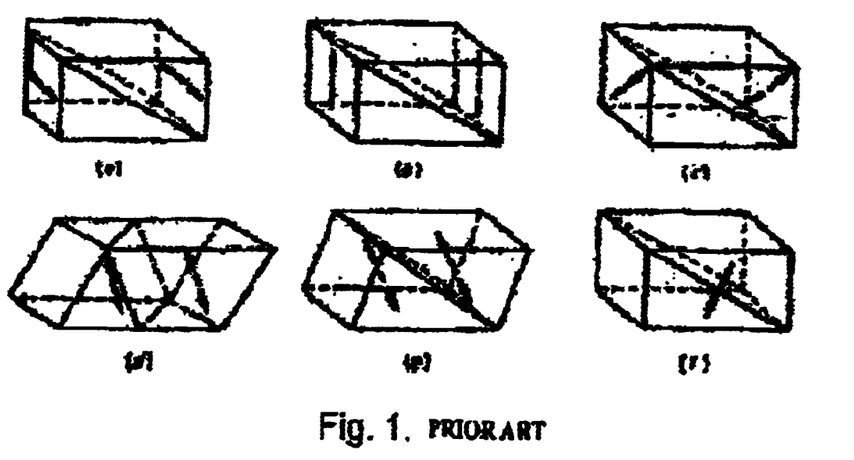
Figure 2:
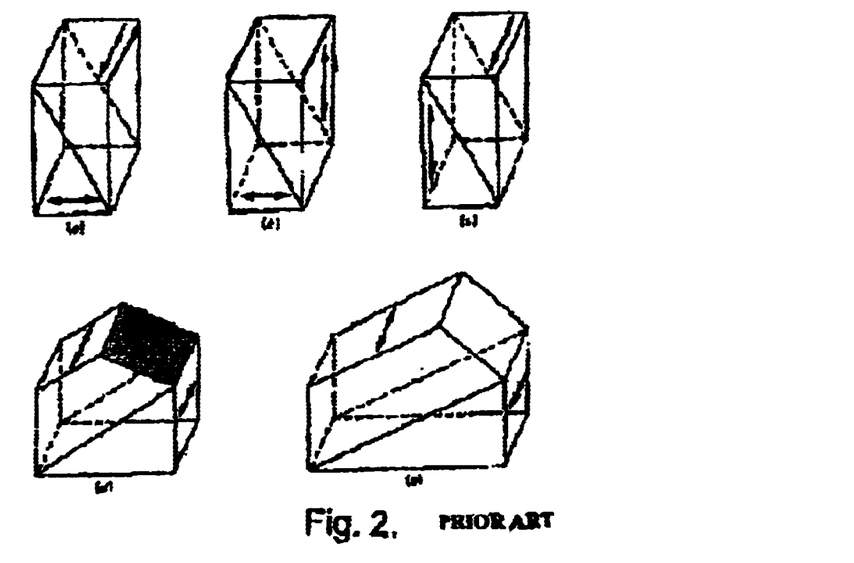

Prisms are subdivided into one-beam prisms, from which only one linearly polarized light beam exits, and two-beam prisms, that produce two light beams polarized in mutually perpendicular planes (orthogonally polarized beams). The former type prisms operate on the basis of the total internal reflection principle. A nonpolarized incident beam is split in the prism into two orthogonally polarized beams. One of these beams undergoes total internal reflection at the prism bounding and is defected, while the other beam passes through the bounding for further use or processing. Such prisms are know as the Nicol, Glazebrook, Hartnack-Prazmowsky, Ahrens, etc., prisms. FIGS. 1(a)–(f) shows some of these prisms (a), (b) and (c) are Glan-type prisms know as the Glan-Thompson (a), Lippich (b) and Frank-Ritter (c) prisms. The second row in FIGS. 1(a)–(f) shows Nicol-type prisms, i.e., the conventional Nicol prism (d), the Nicol-Halle form prism (e), and the Hartnack-Prazmowsky prism (f). The optical axes of the prisms are shown in FIGS. 1(a)–(f) with double arrows.

Variations in the structure of the prisms is normally accompanied by changes in the prisms' names. For example, the air-gap Glan-Thompson prisms are referred to as the Glan-Foucault prisms, and the air-gap Lippich prisms as the Glan-Taylor prisms. In practice, any of these prisms can be referred to as a Glan prism. The air-gap Nicol prisms are referred to as the Foucault prisms. There also are combinations of three bound prisms, the so-called double prisms. The double Glan-Thompson prisms are referred to as the Ahrens prisms.

FIGS. 2(a)–(e) shows various types of the two-beam polarizing prisms. The optical axes of the two parts of the Rochon (a), Senarmont (b), and Wollaston (c) prisms are perpendicular to each other. The foster (d) and the beam-splitting Glan-Thompson (e) prisms have parallel optical axes. In this respect these prisms are similar to one-beam polarizing prisms, but their shape is changed so the two beams propagate in specific directions without noticeable losses.

The need for the great variety of existing polarizing prisms (not all of them are shown here) stems from the impossibility of designing a prism having universal parameters. Each polarizing prism has its individual advantages and drawbacks that determine its applicability. Prisms are characterized by a number of parameters, such as angular separation of the beams, angular aperture, extinction, spectral operation range, optical losses, resistance to high-power optical radiation and external thermal, humidity and mechanical impacts, entrance hole (geometrical aperture), linear sizes, durability, manufacturability and, of course, cost.

Example of one of the latest polarizing prism beam splitter is given in U.S. Pat. No. 6,018,048 issued on Jan. 25, 2000 to J. Pan et al. This splitter consists of a collimator and two similarly shaped birefringent crystal prisms. The light from the collimator is incident upon the first face of the first birefringent crystal prism, which also has second and third faces. In the first prism the collimated light that has passed along a normal to the first entrance face is incident onto the second face at a certain angle. The light component polarized perpendicular to the incidence plane is reflected without losses from the second face and is directed towards the third face of the first prism, while the light component polarized in the incidence plane is refracted to the second prism through the gap between the prisms. This thin gap is formed by parallel second faces of the prisms. The first (exit) face of the second prism is positioned relative to the second face of the second prism in exactly the same manner as the first face of the first prism is positioned relative to the second face of the first prism. As a result, the light that exits the second prism is refracted essentially along a normal to the first face of the second prism without cross-sectional distortions.

It is noteworthy that in all aforementioned combined polarizing prisms, including the one described in U.S. Pat. No. 6,018,418, separation of polarized beams occurs on the boundary between the two optical elements. This is important because, apart from beam splitting, optical losses occur due to fundamentally unavoidable Fresnel reflection and the cement material absorption on the boundary. As has been noted, the optical losses put limits upon the applicability of prisms in the UV range and high-power coherent laser engineering because the cement layer in the gap between the optical elements is frequently destroyed by such radiation. Vacuum and air gap prisms are used in the above applications, but in that case Fresnel losses increase due to the removal of immersion on the gap boundaries, thus the applicability of this design is limited. This problem could be solved by using very thin gaps with thicknesses on the order of wavelength, but in that case, apart from serious technological difficulties, optical losses in the reflected beam would grow unavoidably. This will occur due to the penetration/tunneling of this beam through the gap, which effect would unavoidably impair the forward beam extinction ratio. Depending on prism design, such losses may be as high as 10%.

Another disadvantage of multielement prisms is their complex and troublesome technology. In their manufacturing it is necessary to provide high optical quality on cemented surfaces, exact mutual orientation of the crystal prisms, high-quality cementing without inclusions, and uniform gap thickness. It is also necessary to take into account anisotropic thermal expansion in the prism components, especially in case of different optical axis orientations, choose an appropriate cementing composition, etc. Moreover, complex prisms usually require an increased consumption of the deficient single-crystal material, especially where all the prism elements should be single-crystals.

Many of the abovementioned problems could be solved by using simple uncemented trihedral single crystal prisms made of birefringent crystals. Beams in these anisotropic prisms, the shapes of which are similar to those of usual isotropic dispersion prisms, are split due to refraction at the prism faces. However, the direct use solely of the beam refraction does not solve the problem. As has been noted, a refracting prism splits beams into two, but the separation angles are not large due to the small difference in the refraction coefficients of most materials, except for Te, Se and $TiO_2$. Another disadvantage is the unavoidably different frequency dispersions of the polarized beam deflection angles in case of uncomfortable skewed beam exit from the prism, which also results in an increased reflection loss. Nevertheless, in spite of their drawbacks, the aforementioned trihedral single crystal prisms still find practical application, primarily in the UV range. These prisms are usually made of weakly refracting quartz crystals ($SiO_2$) or magnesium fluoride crystals ($MgF_2$) which are transparent in this spectral range.

Attempts have been made to solve these problems by using the effect of polarized beam separation upon total internal reflection (hereafter referred to as TIR) in a birefringent crystal. One such attempt is a method of separating polarized beams described by B. R. Belostotski, Yu. V. Lyubarsky and V. M. Ovchinnikov in *Fundamentals of Laser Engineering*, Moscow, Sovetskoe Radio, 1972, pp. 125–127. According to this method, the wave vector of the extraordinary beam (the e-beam) after total internal reflection in an anisotropic crystal is oriented, in the general case, at a non-zero angle relative to the wave vector of the ordinary beam (the o-beam). It is a common practice based on the simple logic to maximize the angular separation of the beams by using such crystal orientation and providing for such beam propagation directions before and after the total internal reflection that ensures the maximum absolute difference in the birefringence refraction indices ($\Delta N=|N_o-N_e|$). The applicant has found that this conception is not quite correct and that such an approach does not provide the maximum possible angle of beam separations. In the aforementioned known method the angle of separation between the beams after reflection is achieved by making the optical beam incident onto the reflecting surface at an angle of 45° and by choosing such crystal optical axis orientations that the optical beam before the total internal reflection could propagate either along the optical axis or perpendicular thereto. Under such conditions, the o-beam will obey the rule of equal angles of incidence and reflection for the incident and reflected beams, while the e-beam will not obey this trivial rule and after reflection will propagate at a certain angle to the o-beam. Depending on the axis orientation and on whether the crystal is negative ($N_o > N_e$) or positive ($N_e > N_o$), this angle can be positive or negative.

For example, in optically uniaxial calcite ($CaCO_3$) the angular difference between the wave vectors of the o- and e-beams after reflection for an incident optical radiation wavelength of about 1.06 $\mu m$ is 6.5° inside the crystal (the radiation is incident upon the reflection surface along the optical axis) or 5.4° (the radiation is incident upon the same surface in a direction perpendicular to the optical axis). The beams separated using that method will be further separated upon their exit to the air through the refracting exit surface. The disadvantages of this method are almost the same as for refracting prisms, i.e., small beam separation angles due to small $\Delta N$, uncomfortable exit of the beams, and uncompensated frequency dispersion of the e-beam reflection angle. In this method, however, the Fresnel reflection losses are slightly lower than in the case of purely refracting prisms (without additional total internal reflection). This is because the beams exit the crystal close to normal to the refracting surface.

Thus, it has been shown that the existing polarizing prisms of the type described above have a strictly limited and predetermined geometry and orientation of optical axes. In particular, in the work of B. R. Belostotski, et. al described in the aforementioned reference the incidence angles and orientations of optical axes, though provide separation of the polarized beams, are not optimized and therefore do not allow obtaining of large angles of beam separation. Furthermore, the use only of the Brewster effect or only of the total internal reflection for separation of the polarized beams does not allow obtaining a two-beam polarizer with high extinction and with low optical losses. The use of both these effects in polarizing anisotropic prisms for widening the range of polarized beam separation angle has not been known.

Furthermore, although the known combined multielement prisms ensure a wide range of angle separation, they possess a common fundamentally unavoidable drawback, i.e., existence of a thin beam-splitting gap, the negative properties of which put limits upon the applicability of the prisms and increases the cost of their manufacturing. An attempt to solve the above problem by using the aforementioned non-optimized orientations of crystals and values of angles of incidence did not allow to widen the range of separation angles.

OBJECTS OF THE INVENTION

It is an object of the present invention to provide a single-crystal anisotropic prism or a combination of prisms, at least one of which is an anizotropic one, which divide an incident beam into two orthogonally polarized beams with the increased angle of separation. It is another object to provide the prism or a prism combination of the aforementioned type which are characterized by minimal optical losses, reduced frequency dispersion of an angle between the polarized beams, and retaining the general initial propagation direction of the beams. Still another object is to provide the prisms of the aforementioned type which are free of cemented connections or air gaps between the prism elements and therefore are simple in construction and simple and inexpensive in the manufacture. It is another object of the invention to provide a method of manufacturing the prisms of the aforementioned type by widening the range of allowable angle of incidence and by selecting specific orientations of the crystal.

BRIEF DESCRIPTION OF THE DRAWINGS

FIGS. 1(a)–(f) illustrates known one-beam polarizing prisms.

FIGS. 2(a)–2(f) illustrates known two-beam polarizing prisms.

SUMMARY OF THE INVENTION

An anisotropic single-crystal polarizing prism for separation of the non-polarized beam into two orthogonally-polarized beams with minimal optical losses. The prism has a tetrahedral shape and is formed by four base planes having a predetermined angular orientation with respect to each other so that one of the polarized beams exists the prism at the Brewster angle by being refracted on the third base plane, while the second beam is reflected from the third base plane with total internal reflection and exits the prism through the fourth base plane in the normal direction thereto. The prisms is manufactured by the method of the invention which involves specific procedures of orienting of crystal at preliminary calculated angles to the planes of the prism faces, and cutting the aforementioned base planes with reference to the calculated angles. The prism of the invention is a single-crystal device which is free of cementing connections and microscopic air gaps inherent in conventional prisms combined from separate elements. The single-crystal prism of the invention possesses characteristics unattainable in known polarizing single-crystal prisms.

DETAILED DESCRIPTION OF THE INVENTION

For better understanding the principles of the present invention, it would be advisable first to briefly explain behavior of incident and exit beams on surfaces of a polarizing prism, in particular for incident beams with preliminarily increased angles between their wave vectors.

Let us begin with reflection and refraction in an optically anisotropic crystal referring to analysis of crystal optics as described in the fundamental monograph entitled *Principle of Optics*, Max Born and Emil Wolf, Sec. Edition, Pergamon Press, Oxford * London * Edinburgh * New York * Paris * Frankfurt, 1964.

The simplest solution to the problem of separating two polarized beams in the space through a large angle while keeping the optical losses low is to simultaneously use total internal reflection and refraction at one surface at angles close or equal to the Brewster one.

The applicant has found that simultaneous use of the Brewster effect and the effect of total internal reflection in anisotropic polarizing prisms for widening the angle of separation between the polarized beams results in a synergetically effective increase in the beam separation angle in combination with reduced optical losses. More specifically, the combination of the aforementioned effects makes it possible to obtain angles unattainable in know single-crystal prism-type polarizers. This statement will be explained in more detail below.

In context of the present invention the term "anisotropic polarizing prism" means "a prism transparent to a visible as well as to an invisible light". It is assumed that each light beam is defined by a wave vector inherent in this beam.

Figure 3:
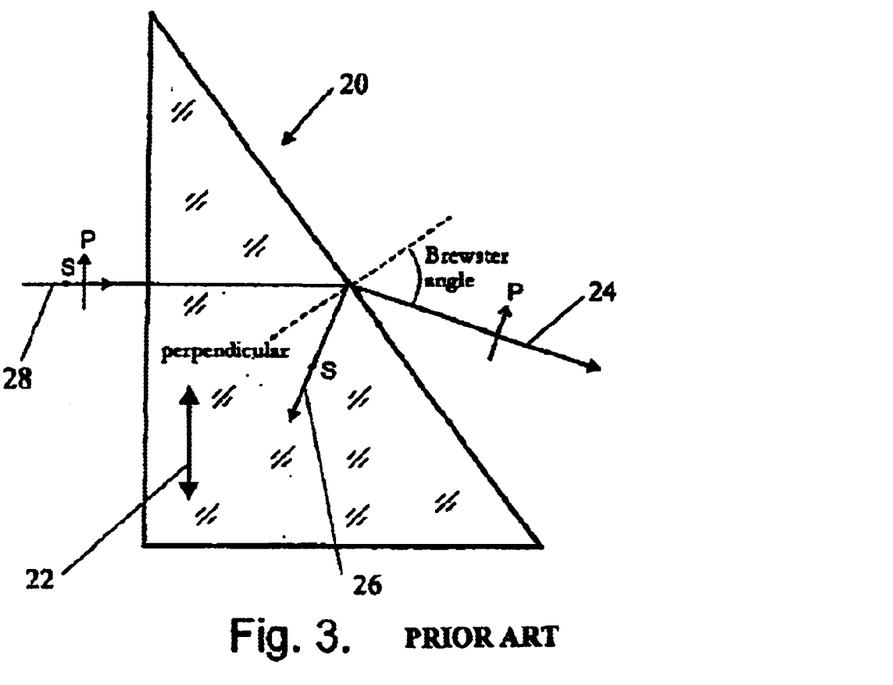
FIG. 3 is a view that illustrates a known prism that operates on the principle of total internal reflection with simultaneous refraction on one of the prism surfaces at angles close or equal to the Brewster one.

FIG. 3 is a view that illustrates an example of a single-axis crystal prism 20 of the invention that operates on the principle of total internal reflection with simultaneous refraction on one of the prism surfaces at angles close or equal to the Brewster one. The illustrated prism is made of an arbitrary optically uniaxial crystal. The optical axis 22 of the prism 20 can be oriented either perpendicular to the figure plane (for positive crystals, $N_e > N_o$, where $N_e$ and $N_o$ are main refraction indices of e-beam 24 and o-beam 26, respectively) or in the figure plane, perpendicular to the incident unpolarized beam 28 (for negative crystals, $N_o > N_e$). The condition given below in formula (1) can be easily derived for simultaneous occurrence of the Brewster refraction of the p-polarized beam 24 (the polarization plane is coincident with the incidence plane) and the TIR of the s-polarized beam 26 (the polarization plane is perpendicular to the incidence plane):

$$\Delta N \geq 1/(N_o + N_e), \tag{1}$$

where $\Delta N = |N_o - N_e|$, and $N_o$ and $N_e$ are the same as defined.

Study of conditions at which equation (1) is satisfied shows that such a condition could be satisfied only by a few known birefringent crystals that have high optical anisotropy (further the term optical anisotropy will stand for the magnitude $\Delta N = |N_o - N_e|$ that is referred to as the magnitude of birefringence in practice. For biaxial crystals, $\Delta N$ means the extreme difference $\Delta N = |N_{max} - N_{min}|$, where $N_{max}$ and $N_{min}$ are two extreme values of indices on axes of the Fresnel indicatrix (the index ellipsoid). The index ellipsoid is an ellipsoid whose three perpendicular axes are equal in length to the principal values of the index of refraction of light in an anisotropic medium. Among the crystals transparent in the visible and near IR spectral ranges, only rutile (TiO2, $N^{\lambda=6328\ nm} = 2.583$, $N^{\lambda=6328\ nm} = 2.865$) satisfies this condition with a little safety margin. In a middle-IR range, this condition is satisfied by Te and Se crystals, but these materials have not yet found wide practical application because of their low mechanical hardness and high absorption.

Referring to rutile, even though the aforementioned condition of simultaneous occurrence of the Brewster effect refraction and the total internal reflection exists, this condition can be obtained only within a very limited range of incidence angle.

Thus, single-crystal prisms that can produce wide angular separation of polarized light beams in the UV, visible and near IR ranges are practically unknown. High-quality optical crystals of rutile have been produced only recently, and prisms such as those shown in FIG. 3 made of this material will probably find practical application in the near future, though the cost of this material is still high.

Figure 4:
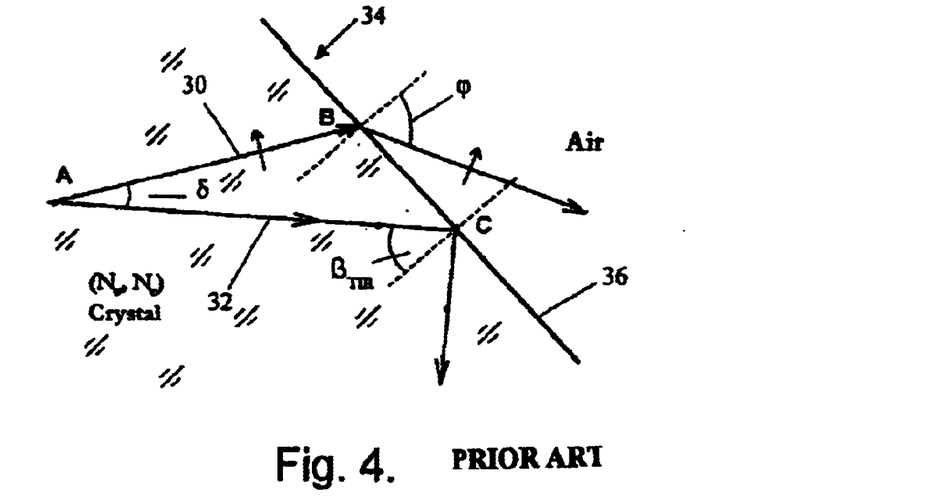
FIG. 4 is a schematic view that illustrates preliminary separation of beams inside a crystal for subsequent separation of these beams on the crystal surface in accordance with the present invention.

The applicant has found that in order to use other birefringent crystals in the production of polarizing prisms with the same principle of polarized beam separation at the exit surface as described above, it would be advantageous to preliminarily transform the beams incident upon that surface in such a way that the wave vectors of the orthogonally polarized beams do not remain collinear but form such a beam separation angle δ (FIG. 4) that the conditions of total internal reflection be satisfied for one beam and the conditions of refraction be satisfied for the other beam, e.g. at the Brewster angle, at the exit surface. FIG. 4 is a schematic view that illustrates preliminary separation of beams 30 and 32 inside a crystal 34 for subsequent separation of these beams on the crystal surface 36 in accordance with the present invention. In FIG. 4, symbol φ designate the Brewster angle in air.

It should be noted that beam 30 is polarized in a plane of incidence onto the crystal surface 36, and the beam 32 is polarized in a plane perpendicular to the plane of incidence of the beam 30.

The new criterion of simultaneous use of the Brewster angle and the occurrence of the total internal reflection can easily be derived from the condition that the sum of three angles in the triangle ABC in FIG. 4 must be equal to 180°. After simple transformations the new criterion is as follows:

$$|\delta| \geq \delta_{cr}, \tag{2}$$

where $$\delta_{cr} = \text{arc Tg} \cdot \{[N_e^* - (N_o^2 - 1)^{1/2}] \cdot [N_e^* \cdot (N_o^2 - 1)^{1/2} + 1]^{-1}\} \tag{3}$$

and $N_e^*$ is the e-beam refraction index in its propagation direction, calculated using the well-known formula (4) for uniaxial crystals $$N_e^* = N_o \cdot N_e \cdot [N_o^2 \cdot \sin^2(\theta) + N_e^2 \cdot \cos^2(\theta)]^{-1/2}, \tag{4}$$

where θ is the angle between the light wave vector and the crystal optical axis.

For a critical angle $\delta_{cr}$ it is more comfortable to use the simpler but more rigorous expression of $\delta_{cr}^{rig}$ which yields a result that is by about 15% greater than $\delta_{cr}$:

$$\delta_{cr}^{rig} = \text{arc tan} \cdot \{[N - (N_o^2 - 1)^{1/2}] \cdot [N_e \cdot (N_o^2 - 1)^{1/2} + 1]^{-1}\} \text{ for crystals with indices } N_o > N_e \tag{5}$$

$$\delta_{cr}^{rig} = \text{arc tan} \cdot \{[N_e - (N_o^2 - 1)^{1/2}] \cdot [N_o \cdot (N_o^2 - 1)^{1/2} + 1]^{-1}\} \text{ for crystals with indices } N_e > N_o. \tag{6}$$

Though overestimating, this latter criterion is useful because it provides for some minimum angular safety margin that is necessary to keep the prism angular aperture different from zero. For calcite crystal (CaCO3, $N_o^{(\lambda=1060\ nm)} = 1.6425$, $N_e^{(\lambda=1060\ nm)} = 1.4797$) this rigorous criterion $\delta_{cr}^{rig}$ is $6.614_o$.

Let us check if condition (2) is satisfied by the above-mentioned beam configuration in a negative calcite crystal ($CaCO_3$) where the beams, incident upon the reflecting surface at 45° and totally reflected at that surface, propagate further at 1) relative angles $\delta_\parallel = +6.5°$ (the beam is incident upon the TIR surface parallel to the optical axis and is reflected at a greater angle than for the o-beam) and 2) relative angles $\delta_\perp = -5.4°$ (the beam is incident upon the TIR surface perpendicular to the optical axis and is reflected at a lower angle than for the o-beam. It should be noted that all angles are counted from normals to appropriate surfaces. Thus, it is to be checked if there is such a position of the exit surface in which the e-beam can be refracted above this surface at the Brewster angle and the o-beam can undergo total internal reflection from the same surface. Calculation of the e-beam refraction index after reflection yields for the two optical axis orientations results in the following: $N_e^*(\parallel) = 1.4815$ and $N_e^*(\perp) = 1.6408$.

Figure 5:
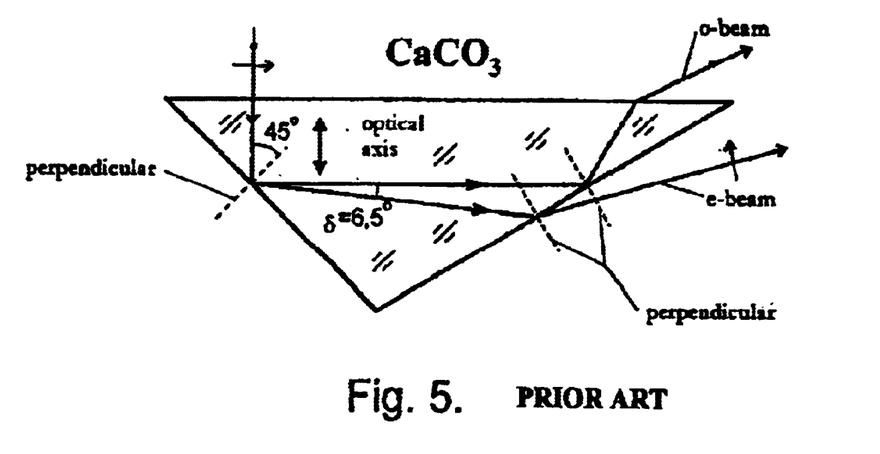
FIG. 5 is a schematic view illustrating the specific case of a conventional non-optimized selection of the incident angle and crystal orientation, the reference to this drawing being made to emphasize the advantage of optimized selection of the above parameters by the method of the present invention.

Substituting these magnitudes and the aforementioned $N_o$ and $N_e$ into equation (3), produces the following critical relative angles: $\delta_{cr}(\parallel) = 3.486°$ and $\delta_{cr}(\perp) = 6.143°$. It can be seen that condition (2) is satisfied only when the entrance beam is parallel to the optical axis (6.5°>3.486°) and is not satisfied for the entrance beam perpendicular to the optical axis (5.4°<6.143°). However, the beam configuration obtained in the former case (the entrance beam is parallel to the optical axis) is not comfortable because one of the beams will propagate almost in the direction opposite to that of the entrance beam (the o-beam), and the other beam will propagate almost perpendicularly to that direction. This is shown in FIG. 5 which is a schematic view illustrating the specific case of a conventional non-optimized selection of the incident angle and crystal orientation, the reference to this drawing being made to emphasize the advantage of optimized selection of the above parameters by the method of the present invention.

On the other hand, if one can increase the preliminary separation angle $\delta_\perp$ to an extent to satisfy equation (2), a prism with a comfortable beam configuration can be obtained using the second variant.

It is suggested in the present invention to achieve this additional increase in the preliminary separation angle $\delta_\perp$ (or $\delta_\parallel$) by using total internal reflection from a surface of an optically anisotropic crystal due to larger angles of incidence of a beam upon the reflecting surface and the optimum optical axis orientation for uniaxial crystals, or due to optimum orientation of the elliptical optical indicatrix section axes in biaxial crystals.

Figure 6:
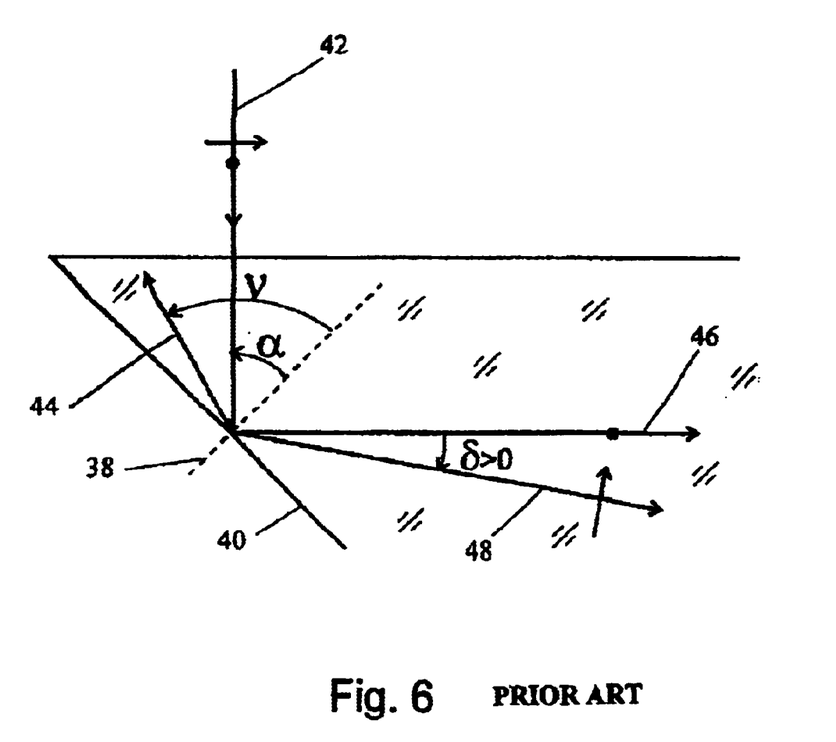
FIG. 6 is a view illustrating the path of beams in the case of total internal reflection in an anisotropic optical medium.

To simplify the understanding of the above idea, it is advantageous to consider the process of total internal reflection in an optically uniaxial crystal with indices $N_o$ and $N_e$. Beam paths, position of the optical axis, and the total internal reflection surface in such a crystal are shown in FIG. 6. In FIG. 6, all angles, except for angle $\delta$, are calculated from a normal 38 to the reflection surface 40. Angle $\alpha$ is an incidence angle of the initial unpolarized beam 42, angle $\nu$ is an orientation angle of the optical axis 44 and $\delta$ is a relative beam separation angle after reflection. In FIG. 6, reference numerals 46 and 48 designates the o-beam and e-beam, respectively. If the e-beam reflection angle is greater than the o-beam reflection angle, angle $\delta$ is treated as positive (the case of FIG. 6), and vice versa. The o-beam 46 reflection obeys the rule stating that the incidence and reflection angles are equal, but this trivial rule does not hold for the e-beam 48. This latter beam obeys the generalized Snell law under which the refraction indices are functions of the angles. An appropriate equation that describes the e-beam reflection in an optically uniaxial crystal is as follows:

$$N_{1e} \cdot \sin(\alpha_1) = N_{2e} \cdot \sin(\alpha_2). \tag{7}$$

Here incidence angles $\alpha_1$ and $\alpha_2$ and e-beam refraction indices $N_{1e}$ and $N_{2e}$ correspond to the aforementioned beams prior to reflection (subscript 1) and after reflection (subscript 2), respectively. According to FIG. 6, equation 7) can be expanded to $$N_o \cdot N_e \cdot [N_o^2 \cdot \sin^2(\nu-\alpha) + N_e^2 \cdot \cos^2(\nu-\alpha)]^{-1/2} \cdot \sin(\alpha) = = N_o \cdot N_e \cdot [N_o^2 \cdot \sin^2(\nu+\alpha+\delta) + N_e^2 \cdot \cos^2(\nu+\alpha+\delta)]^{-1/2} \cdot \sin(\alpha+\delta). \tag{8}$$

Figure 7:
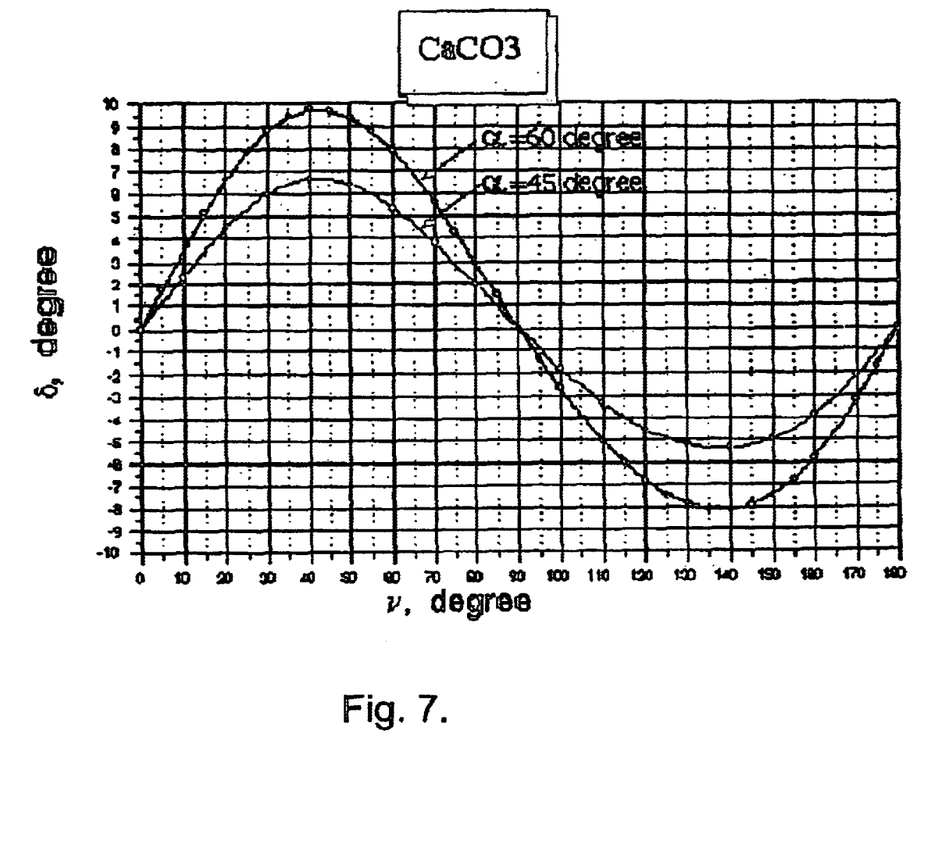
FIG. 7 is a graph illustrating effect of optimal selection of the angle of incidence and orientation of optical axis in calcite on increase in angle of beam separation for two specific angles of incidence.
Figure 8:
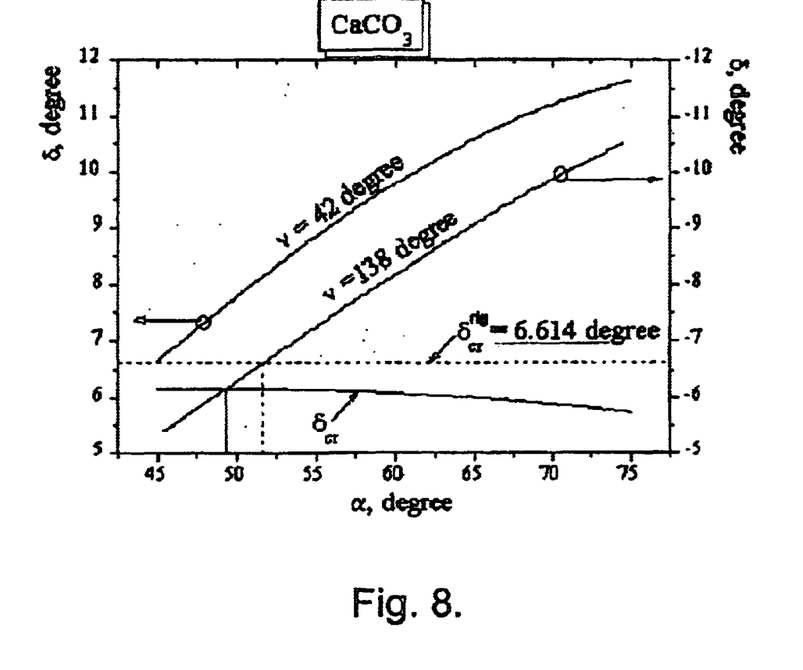
FIG. 8 is graph that illustrates the effect of the angle of incidence on increase in angle of beam separation in calcite under conditions of optimal selection of the crystal axis orientation for two specific orientations of the optical axis.

Solutions of this equation for a calcite crystal ($CaCO_3$) are illustrated in FIG. 7 by plots of separation angle $\delta$ as a function of incidence angle $\alpha$ and optical axis orientation $\nu$. Analysis of these curves shows that to increase the separation angle $\delta$ one should increase the angle $\alpha$ of beam incidence upon the reflecting surface at such angles $\nu$ for which the plots have extremes. FIG. 8 shows more detailed theoretical plots of separation angle $\delta$ as a function of incidence angle $\alpha$ at the angles $\nu=42°$ and $\nu=138°$ which corresponds to the extremes on the graphs.

Criteria $\delta_{cr}$ and $\delta_{cr}^{rig}$ are also shown FIG. 8. Comparison of the curves in FIG. 8 shows that criterion (2) is satisfied (with some safety factor) for the pair of beams with a negative $\delta$ already at $\alpha$ above 50°. This, in turn, suggests that a very comfortable beam separation configuration at a potential exit surface is achieved for this pair of beams, i.e. the e-beam can be directed outwards, e.g., at the Brewster refraction angle, i.e., only with negligible reflection losses, and the o-beam will definitely undergo total internal reflection from that surface and will abruptly change its direction. Furthermore, the o-beam can be directed outward through an additional normal surface with an interference antireflection coating. In general, both beams will retain their directions of propagation relative to the initial beam incident upon the prism.

Figure 9:
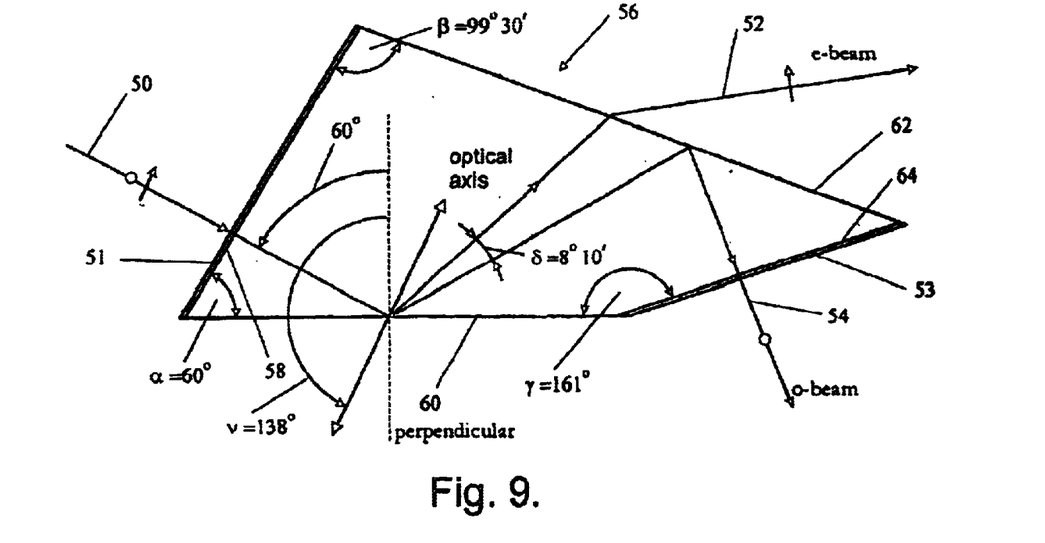
FIG. 9 is an example of a single-crystal polarizing calcite prism made in accordance with the present invention.

The prism of the invention is shown in FIG. 9 which is a longitudinal sectional view of the prism with illustration of path of the beams. This prism, which in general is designated by reference numeral 56, is made of a uniaxial or a biaxial crystal. Let us assume, for simplification of description, that it is made of a uniaxial crystal, such as calcite ($CaCO_3$). As can be seen from FIG. 9, the prism comprises a four-sided polygon and has four base planes, i.e., a first base plane 58, a second base plane 60 forming an angle $\alpha$ with the first base plane 58, a third base plane 62 located opposite to the second base plane 60 and forming an angle $\beta$ with the first base plane 58, and a fourth base plane 64 located opposite to the first base plane 58 and forming an angle $\gamma$ with the second base plane 60. It is important to note that all four angles of the prism differ from each other and all base planes, i.e., all sides of the four-sided polygon, are not parallel. At least the first base plane 58, through which the non-polarized beam 50 enter the prism, and the fourth base plane 64, through which one of the polarized beams (which is described later) leaves the prism, are coated with antireflective interference coatings 51 and 53 shown on FIG. 9.

One of the prisms of FIG. 9 made by the applicant from calcite ($CaCO_3$) hand angle $\alpha=60°$ and angle $\nu=138°\pm3°$. Only the directions of wave vectors 50, 52, and 54 are shown in FIG. 9. Strictly speaking, however, the e-beam energy propagates at a certain angle to an appropriate wave vector, but, because this angles is small, this factor can be ignored as it affects only the linear dimensions of the prism.

The prism 56 operates in a manner described below.

The entrance beam 50 enters the prism 56 of FIG. 9 through the first antireflection-coated surface 58 along its normal. Under this condition the angle between the first entrance surface 58 and the second surface 60, at which the entrance beam 50 undergoes total internal reflection, is equal to the chosen angle of incidence α=60°. The other angles of the prism are determined by the exiting conditions of the e-beam 52 and the o-beam 54. If the e-beam exits at the Brewster angle φ as shown in FIG. 9, then angle β between the first face 58 and the third prism face 62 is uniquely determined by the following formulas:

$$\beta = 180° - (2\cdot\alpha + \delta) + \arctan(1/N_e^*), \quad (9)$$

where $$N_e^* = N_o \cdot N_e \cdot [N_o^2 \cdot \sin^2(\nu + \alpha + \delta) + N_e^2 \cdot \cos^2(\nu + \alpha + \delta)]^{-1/2}. \quad (10)$$

Here angle δ is substituted into the formulas taking into account its sign (i.e., this angle may have a positive or a negative values), and the expression for $N_e^*$ is true for uniaxial crystals only.

With reference to the uniaxial or biaxial crystals, it should be noted that the invention relates to crystals of both these types. However, in the case of a uniaxial crystals, it should be noted that the crystal of this type has only one optical axis, which fully determines optical orientation of the crystal. The meaning of the optical orientation consists in that a value of the refraction index for the e-beam is unequivocally determined by the angle between the direction of the e-beam and the aforementioned optical axis. In the case of biaxial crystals the picture becomes more complicated. This is because the biaxial crystal has three main sectional planes of Fresnel indicatrix having so called axes of the optical indicatrix ($N_x = N_{min}$, $N_y = N_{mean}$, and $N_y = N_{max}$, where $N_x$, $N_y$, and $N_z$ are main values of refraction indices along axes X, Y, and Z, respectively, and where "min" designates "minimal", "mean" designates an average, and "max" designates "maximal"). The plane of propagation of the incident and reflected beams may coincide with any of the aforementioned three main section planes. Therefore, in the case of a biaxial crystal, first it is necessary to select one main section plane of propagation of the beams.

More specifically, for a biaxial crystal this condition can be expressed as follows:

$$\delta_{cr} = \arctg \{[N_e^{} - (N_{e1}^2 - 1)^{1/2}] \cdot [N_e^{} \cdot (N_{e1}^2 - 1)^{1/2} + 1]^{-1}\} \quad (9a)$$

and $N_e^{**}$ is the refraction index of the e-beam calculated in the direction of propagation, using the following formula:

$$N_e^{**} = N_{e1} \cdot N_{e2} \cdot [N_{e1}^2 \cdot \sin^2(\nu + \alpha + \delta) + N_{e2}^2 \cdot \cos^2(\nu + \alpha + \delta)]^{-1/2} \quad (10a)$$

where $N_{e1}$ and $N_{e2}$ are refraction indices selected in the selected plane from the main values of refraction indices along the axes X, Y, and Z. The resulting angle (n+a+d) is an angle between the light-wave vector and one of the orientable axes of the optical indicatrix in the selected main-section plane.

After the above selection, the problem is reduced practically to the case of a single-crystal prism.

Third angle γ between the second surface 60 and the fourth surface 64 is determined from the condition that o-beam 54 must exit the prism 56 along a normal to the fourth exit surface 64 and is calculated as follows:

$$\gamma = 540° - 2\cdot\beta - 3\cdot\alpha. \quad (11)$$

Thus it has been shown that the prism 56 of the embodiment of the present invention shown in FIG. 9 is a single-crystal polarizing optical element produced without cementing or technological gaps. In this prism polarized beams 52 and 54 with an enlarged separation angle δ are separated at a polished face 60 inside the prism 56. The prism 56 of the invention is characterized by minimal optical losses due to simultaneous occurrence of total internal reflection and Brewster angle refraction on one of the prism's faces prior to exit of the beam from the prism. This becomes possible due to the preliminary separation of the beams at the preceding face at an incidence angle increased as compared to conventional prism of the type shown in FIG. 5. Optical losses in the prism are determined primarily by the prism material, quality of prism surface polishing, and residual reflection from the entrance and exit (for o-beam) surfaces that have interference antireflection coatings.

Figure 10:
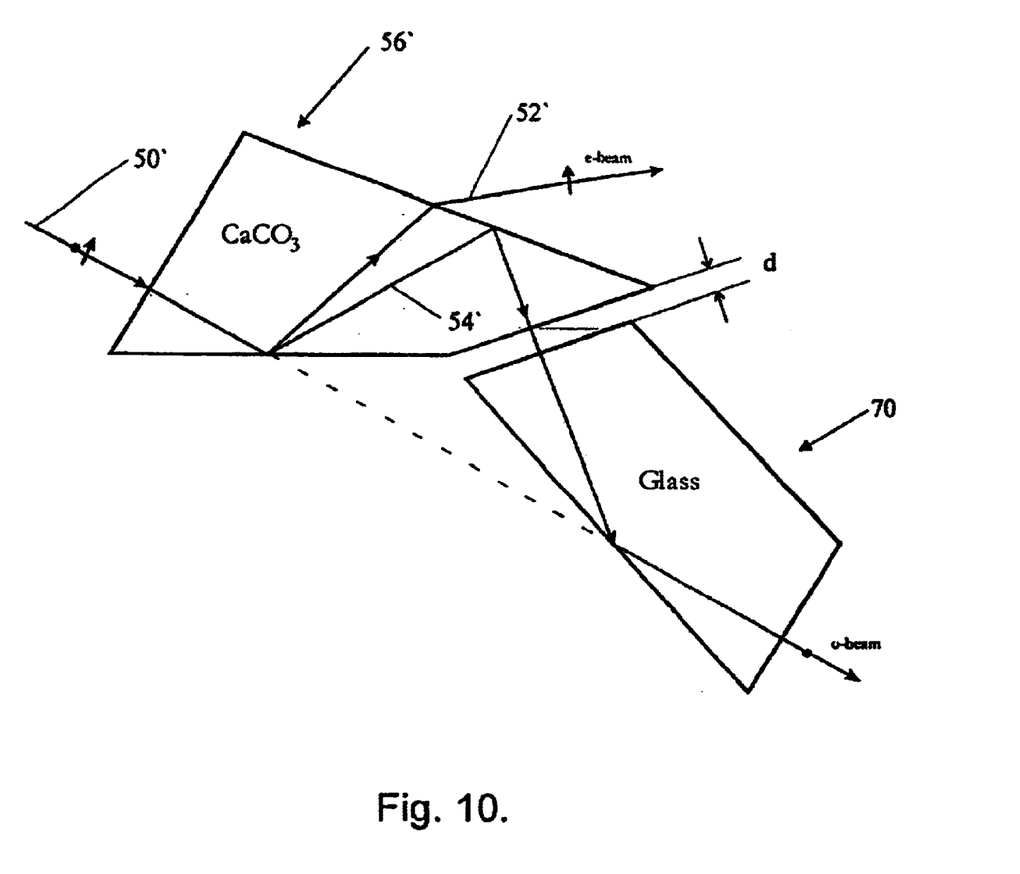
FIG. 10 is an example of a Rochon-type optical system consisting of a single-crystal polarizing prism of the invention in combination with a simple glass prism.

The principle of the present invention will not be violated if a single-crystal polarizing prism of the type shown in FIG. 9 is combined with other conventional prisms, such as a glass prism, which are combined without a small air gap or a cement bond used in common practice for manufacturing known polarizing prisms on the basis of birefringent prisms. Such a combination, which can be classified as a Rochon-type optical system, is shown in FIG. 10. In FIG. 10, reference numeral 56' is a prism of the invention shown in FIG. 9 with appropriate angles and beams which are designated by the same reference numeral and symbols but with an addition of prime ('). Thus, 50' is an incident beam, 52' is the e-beam, 54' is the o-beam, etc.

Reference numeral 70 designates a glass tetrahedral prism which is spaced from the prism 70 as a distance "d" which may have an arbitrary magnitude and is determined by specific application conditions. In any case, this distance is much greater than the air gaps or cement thickness used in the manufacture of conventional combined polarizing prisms, where such gap is determined by the thickness of the cement layer between the prism components. Normally such a gap is within the range of several to several tens micrometers. In the case of the present invention the distance "d" is on the order of several fractions of millimeters to several millimeters or more. In other words, in the system of FIG. 10 the gap "d" is not a critical technological factor as in conventional multicomponent polarizing prisms.

The anizotropic polarizing prism of the invention of the type shown in FIG. 9 can be produced by the following method. First a material suitable for the prism of the invention, i.e., an anizotropic single-crystal material or a biaxial crystal material is selected from crystals that satisfy equation (2). The next step is determining the orientation of the optical axis for a single-axis crystals and of the axes of the optical indicatrix for biaxial crystals with respect to normal to the first main plane of total internal reflection for o- and e-beams. A criterion used in selecting the aforementioned orientation is obtaining the extremes for the curves shown in FIG. 7. In this case, the prism of the invention on can be realized only if the aforementioned extremes correspond to the negative values of the beam separation angle. The next step is selection of the incidence angle which determines the angle between the first and the second faces of the prism. The specific angle α is selected so that the obtained angle δ of separation of the polarized beams exceeds the value of $\delta_{cr}$ ($\delta_{cr}^{strict}$). The greater is the angle α, the higher the safety factor for exceeding the value of the $\delta_{cr}$ ($\delta_{cr}^{strict}$). The next step is selection of other angles which are strictly related to the value of angle α[equations (9) and (11)]. The linear dimensions of the prism are calculated from conventional geometric formulae and depends on the cross section of the incident light. The surfaces of the prism are polished and finished to a required class of optical surface roughness. If necessary, the surfaces normal to the incident and an exiting o-beam are coated with antireflective coatings. The thickness of the prism in the direction perpendicular to the drawings in FIG. 9 is chosen arbitrary, provided the thickness is not less than the cross section of the incident beam.

In one embodiment of the prism of the invention shown in FIG. 9 for a 3.5 mm diameter entrance optical beam and a wavelength of 1.06 μm the $CaCO_3$ prism 56 had the following parameters:

| | |
|---|---|
| entrance surface 58 | 5.4 mm |
| e-beam exit surface 62 | 9.2 mm |
| o-beam exit surface 64 | 4.4 mm |
| total length L | 11.4 mm |
| cross-section thickness | 5 mm |
| $\alpha = 60°$ ; $\beta = 99° 30'$; $\gamma = 161°$ | ±41° (total 82°) |
| separation angles in air for orthogonally polarized beams relative to the initial nonpolarized beam | |

For other beam diameters the prism dimensions is changed proportionally to the beam diameter ratio.

Thus, it has been shown that the invention provides an anisotropic single-crystal polarizing prism with large angles of separation of polarized beams at minimal optical losses. This can be obtained without the use of additional processes of bonding via a cement layer or forming a microscopic gap of a stable thickness, inherence in conventional combined polarizing prisms. The invention also provides a method of manufacturing the aforementioned single-crystal polarizing prism from a wide range of crystalline materials. The invention further provides a prism which has a reduced frequency dispersion of an angle between the polarized beams and which retains the general initial propagation direction of the beams.

Although the invention has been shown and described with reference to specific embodiments, it is understood that these embodiments should not be construed as limiting the fields of application of invention and that any changes and modifications with regard to the shapes and materials are possible without departure from the scope of the attached patent claims. For example, the prism may have five facets obtained by cutting the prism at the sharp angle formed between the third and the fourth facets. The prism may have angles between the facets different from those shown in the aforementioned example, provides that the Brewster effect and the effect of the total internal reflection occur simultaneously. The prism can be made from materials other than those listed in the description. The prism of FIG. 9 can be combined with any other optical elements which allow to change direction of the beams as required by a specific application.

What is claimed is:

1. A method of manufacturing an anisotropic polarizing prism for polarization of a non-polarized light characterized by a wave vector, said prism having a first base plane, a second base plane which forms a first angle $\alpha$ with said first base plane, a third base plane located opposite to said second base plane and forming a second angle $\beta$ with said first base plane, and a fourth base plane located opposite to said first base plane and forming a third angle $\gamma$ with said second base plane, said prism providing reflection of a beam incident on said second base plane through said first base plane in two directions in the form of an e-beam and an o-beam having an angle $\delta$ of separation, said e-beam having an angle of reflection smaller than an angle of reflection of said o-beam and propagates in a direction of propagation towards said third base plane, said method comprising the steps of:

selecting a material for said anisotropic polarizing prism from a group consisting of single-axis crystals and biaxial crystals, each of said single-axis crystals having a single optical axis and each of said biaxial crystals having three main sectional planes of Fresnel indicatrix with axes of the optical indicatrix characterized by $N_x=N_{min}$, $N_y=N_{mean}$, and $N_y=N_{max}$, where $N_x$, $N_y$, and $N_z$ are main values of refraction indices along axes X, Y, and Z, respectively, and where "min" designates "minimal", "mean" designates an average, and "max" designates "maximal";

determining, for said single-axis crystals, the orientation of said single optical axis with respect to the normal to the plane of total internal reflection from said second plane, and for biaxial crystals, determining one of said three main sectional planes of propagation of the beams to form a selected plane and then determining the orientation of one of the axes of the optical indicatrix located in said selected plane;

calculating dependence of said angle $\delta$ from an angle $v$ between said normal to said second base plane and said single optical axis, in the case of said single-axis crystal, and said one of the axes of the optical indicatrix located in said selected plane, in the case of said biaxial crystal;

finding a negative extreme in said dependence;

finding a value of said angle $v$ within the range of ±10% of said angle $v$ for said negative extreme calculated in said step of calculating and found in said step of finding a negative extreme;

forming said second base plane of said prism so that said normal to said second base plane forms said angle $v$ with said single optical axis, in the case of said single-axis crystal, and said one of the axes of the optical indicatrix located in said selected plane, in the case of said biaxial crystal;

forming said first base plane so that a normal to said first base plane be coplanar to a plane which contains said normal to said second base plane and said single optical axis, in the case of said single-axis crystal, and said one of axes of the optical indicatrix located in said selected plane, in the case of said biaxial crystals and so that said e-beam is refracted on said third base plane in a first point and exits said prism at a Brewster angle from said first point, while said o-beam is reflected from said third base plane with total internal reflection from a second point which is different from said first point and exits said prism through said fourth base plane;

forming said third base to obtain said Brewster angle and said total internal reflection; and forming said fourth base plane so that said o-beam can exit said prism through said fourth base plane along the normal to said fourth plane.

2. The method of claim 1, wherein said angle $\alpha$ is selected from the following condition:

$$|\delta| \geq \delta cr,$$

where for a single-axis crystal:

$$\delta_{cr}=\text{arc Tg}\cdot\{[N_e^*-(N_o^2-1)^{1/2}]\cdot[N_e^*\cdot(N_o^2-1)^{1/2}+1]^{-1}\}$$

and $N_e^*$ is the refraction index of said e-beam calculated in said direction of propagation, using the following formula:

$$N_e^*=N_o\cdot N_e\cdot[N_o^2\cdot\text{Sin}^2(v+\alpha+\delta)+N_e^2\cdot\text{Cos}^2(v+\alpha+\delta))]^{-1/2};$$

where $N_o$ and $N_e$ are refraction indices for said o-beam and e-beam, respectively, and where $(v+\alpha+\delta)$ is the angle between said wave vector and said single optical axis, and where for said biaxial crystal:

$$\delta_{cr}=\text{arc Tg}\cdot\{[N_e^{}-(N_{e1}^2-1)^{1/2}]\cdot[N_e^{}\cdot(N_{e1}^2-1)^{1/2}+1]^{-1}\}$$

and $N_e^{**}$ is the refraction index of said e-beam calculated in said direction of propagation, using the following formula:

$$N_e^{**}=N_{e1}N_{e2}\cdot[N_{e1}^2\cdot\text{Sin}^2(\nu+\alpha+\delta)+N_{e2}^2\cdot\text{Cos}^2(\nu+\alpha+\delta)]^{-1/2},$$

where $N_{e1}$ and $N_{e2}$ are refraction indices selected in said selected plane from said main values of refraction indices, and $(\nu+\alpha+\delta)$ is an angle between said wave vector and said one of the axes of the optical indicatrix located in said selected plane.

3. The method of claim 2, wherein said angle β is determined from the following equation:

$$\beta=180°-2\cdot\alpha-\delta+\text{arc tan}(1/N_e^*) \text{ for single-axis crystals}$$

$$\beta=180°-2\cdot\alpha-\delta+\text{arc tan}(1/N_e^{**}) \text{ for biaxial crystals.}$$

4. The method of claim 3, wherein a normal to said third base plane is coplanar to a plane that contains said normal to said second base plane and said single optical axis, in the case of said single-axis crystal, and said one of axes of the optical indicatrix located in said selected plane, in the case of said biaxial crystals.

5. The method of claim 3, wherein said angle γ is determined from the following equation:

$$\gamma=540°-2\cdot\beta-3\cdot\alpha.$$

6. The method of claim 5, wherein a normal to said fourth base plane is coplanar to a plane that contains said normal to said second base plane and said single optical axis, in the case of said single-axis crystal, and said one of axes of the optical indicatrix located in said selected plane, in the case of said biaxial crystals.

7. The method of claim 2, wherein a normal to said third base plane is coplanar to a plane that contains said normal to said second base plane and said single optical axis, in the case of said single-axis crystal, and said one of axes of the optical indicatrix located in said selected plane, in the case of said biaxial crystals.

8. The method of claim 7, further comprising the step of finishing said first base plane, said second base plane said third based plane, and said fourth base plane to the level of optical surface roughness.

9. The method of claim 8, further comprising the step of coating at least said first base plane and said fourth base plane with an antireflective coating.

10. The method of claim 1, wherein said single-axis crystals and said biaxial crystals are selected from crystals represented by the following formulae: $CaCO_3$, $TiO_2$, $YVO_4$, $KNbO_3$, $KTiOPO_4$, $\alpha$-$BaB_2O_4$, $PbMoO_4$, $TeO_2$, Te, and Se.

11. The method of claim 1, further comprising the step of finishing said first base plane, said second base plane said third based plane, and said fourth base plane to the level of optical surface roughness.

12. The method of claim 11, further comprising the step of coating at least said first base plane and said fourth base plane with an antireflective coating.

13. A method of manufacturing an anisotropic polarizing prism for polarization of a non-polarized light characterized by a wave vector, said prism being made of a single-crystal material, said prism having a first base plane, a second base plane which forms a first angle α with said first base plane, a third base plane located opposite to said second base plane and forming a second angle β with said first base plane, and a fourth base plane located opposite to said first base plane and forming a third angle γ with said second base plane, said prism providing reflection of a beam incident on said second base plane through said first base plane in two directions in the form of an e-beam and an o-beam having an angle δ of separation, said e-beam having an angle of reflection smaller than an angle of reflection of said o-beam and propagates in a direction of propagation towards said third base plane, said method comprising the steps of:

selecting a material for said anisotropic polarizing prism from single-axis crystals, each of said single-axis crystals having an optical axis;

determining, the orientation of said optical axis with respect to the normal to the plane of total internal reflection from said second plane;

calculating dependence of said angle δ from an angle ν between said normal to said second base plane and said optical axis;

finding a negative extreme in said dependence;

finding a value of said angle ν within the range of ±10% of said angle ν for said negative extreme calculated in said step of calculating and found in said step of finding a negative extreme;

forming said second base plane of said prism so that said normal to said second base plane forms said angle ν with said optical axis;

forming said first base plane so that a normal to said first base plane be coplanar to a plane which contains said normal to said second base plane and said optical axis and so that said e-beam is refracted on said third base plane in a first point and exits said prism at a Brewster angle from said first point, while said o-beam is reflected from said third base plane with total internal reflection from a second point which is different from said first point and exits said prism through said fourth base plane;

forming said third base to obtain said Brewster angle and said total internal reflection; and forming said fourth base plane so that said o-beam can exit said prism through said fourth base plane along the normal to said fourth plane.

14. The method of claim 13, wherein said angle α is selected from the following condition:

$$|\delta|\geq\delta_{cr},$$

where $$\delta_{cr}=\text{arc Tg}\cdot\{[N_e^*-(N_o^2-1)^{1/2}]\cdot[N_e^*\cdot(N_o^2-1)^{1/2}+1]^{-1}\}$$

and $N_e^*$ is the refraction index of said e-beam calculated in said direction of propagation, using the following formula:

$$N_e=No\cdot Ne\cdot[No^2\cdot\text{Sin}^2(\nu+\alpha+\delta)+Ne^2\cdot\text{Cos}^2(\nu+\alpha+\delta)]^{-1/2},$$

where $N_o$ and $N_e$ are refraction indices for said o-beam and e-beam, respectively, and where $(\nu+\alpha+\delta)$ is the angle between said wave vector and said optical axis.

15. The method of claim 14, wherein said angle β is determined from the following equation:

$$\beta=180°-2\cdot\alpha-\delta+\text{arc tan}(1/N_e^*).$$

16. The method of claim 15, wherein a normal to said third base plane is coplanar to a plane that contains said normal to said second base plane and said optical axis.

17. The method of claim 15, wherein said angle is determined from the following equation:

$$\gamma = 540° - 2\cdot\beta - 3\cdot\alpha.$$

18. The method of claim 17, wherein a normal to said fourth base plane is coplanar to a plane that contains said normal to said second base plane and said optical axis.

19. The method of claim 13, wherein a normal to said third base plane is coplanar to a plane that contains said normal to said second base plane and said optical axis.

20. The method of claim 13, further comprising the step of finishing said first base plane, said second base plane said third based plane, and said fourth base plane to the level of optical surface roughness.

21. The method of claim 20, further comprising the step of coating at least said first base plane and said fourth base plane with an antireflective coating.

22. A method of manufacturing an anisotropic polarizing prism for polarization of a non-polarized light characterized by a wave vector, said prism being made from biaxial crystals, said prism having a first base plane, a second base plane which forms a first angle $\alpha$ with said first base plane, a third base plane located opposite to said second base plane and forming a second angle $\beta$ with said first base plane, and a fourth base plane located opposite to said first base plane and forming a third angle $\gamma$ with said second base plane, said prism providing reflection of a beam incident on said second base plane through said first base plane in two directions in the form of an e-beam and an o-beam having an angle $\delta$ of separation, said e-beam having an angle of reflection smaller than an angle of reflection of said o-beam and propagates in a direction of propagation towards said third base plane, said method comprising the steps of:

selecting a biaxial crystal for said anisotropic polarizing prism from biaxial crystals, said biaxial crystal having three main sectional planes of Fresnel indicatrix with axes of the optical indicatrix characterized by $N_x = N_{min}$, $N_y = N_{mean}$, and $N_y = N_{max}$, where $N_x$, $N_y$, and $N_z$ are main values of refraction indices along axes X, Y, and Z, respectively, and where "min" designates "minimal", "mean" designates an average, and "max" designates "maximal";

determining one of said three main section planes of propagation of the beams to form a selected plane and then determining the orientation of one of the axes of the optical indicatrix located in said selected plane;

calculating dependence of said angle $\delta$ from an angle $\nu$ between said normal to said second base plane and said one of the axes of the optical indicatrix located in said selected plane;

finding a negative extreme in said dependence;

finding a value of said angle $\nu$ within the range of $\pm 10\%$ of said angle $\nu$ for said negative extreme calculated in said step of calculating and found in said step of finding a negative extreme;

forming said second base plane of said prism so that said normal to said second base plane forms said angle $\nu$ with said one of the axes of the optical indicatrix located in said selected plane;

forming said first base plane so that a normal to said first base plane be coplanar to a plane which contains said normal to said second base plane and said one of axes of the optical indicatrix located in said selected plane so that said e-beam is refracted on said third base plane in a first point and exits said prism at a Brewster angle from said first point, while said o-beam is reflected from said third base plane with total internal reflection from a second point which is different from said first point and exits said prism through said fourth base plane;

forming said third base to obtain said Brewster angle and said total internal reflection; and forming said fourth base plane so that said o-beam can exit said prism through said fourth base plane along the normal to said fourth plane.

23. The method of claim 22, wherein said angle $\alpha$ is selected from the following condition:

$$|\delta| \geq \delta_{cr},$$

where $$\delta_{cr} = \operatorname{arc} \operatorname{Tg}\cdot\{[N_e^{} - (N_{e1}^2 - 1)_{1/2}]\cdot[N_e^{}\cdot(N_{e1}^2 - 1)^{1/2} + 1]^{-1}\}$$

and $N_e^{**}$ is the refraction index of said e-beam calculated in said direction of propagation, using the following formula:

$$N_e^{**} = N_{e1}\cdot N_{e2}\cdot[N_{e1}^2\cdot\operatorname{Sin}^2(\nu+\alpha+\delta) + N_{e2}^2\cdot\operatorname{Cos}^2(\nu+\alpha+\delta)]^{-1/2},$$

where $N_{e1}$ and $N_{e2}$ are refraction indices selected in said selected plane from said main values of refraction indices and $(\nu+\alpha+\delta)$ is an angle between said wave vector and said one of the axes of the optical indicatrix located in said selected plane.

24. The method of claim 23, wherein said angle $\beta$ is determined from the following equation:

$$\beta = 180° - 2\cdot\alpha - \delta + \operatorname{arc} \tan(1/N_e^{**}).$$

25. The method of claim 24, wherein a normal to said third base plane is coplanar to a plane that contains said normal to said second base plane and said one of axes of the optical indicatrix located in said selected plane.

26. The method of claim 24, wherein said angle is determined from the following equation:

$$\gamma = 540° - 2\cdot\beta - 3\cdot\alpha.$$

27. The method of claim 26, wherein a normal to said fourth base plane is coplanar to a plane that contains said normal to said second base plane and said one of axes of the optical indicatrix located in said selected plane.

28. The method of claim 23, wherein a normal to said third base plane is coplanar to a plane that contains said normal to said second base plane and said one of axes of the optical indicatrix located in said selected plane.

29. The method of claim 22, further comprising the step of finishing said first base plane, said second base plane, said third based plane, and said fourth base plane to the level of optical surface roughness.

30. The method of claim 29, further comprising the step of coating at least said first base plane and said fourth base plane with an antireflective coating.

* * * * *